US012794579B2

(12) United States Patent
Lu et al.

(10) Patent No.: US 12,794,579 B2
(45) Date of Patent: Nov. 10, 2026

(54) TIME SYNCHRONIZATION METHOD AND TIME SYNCHRONIZATION DEVICE FOR MULTIPLE TIME SYNCHRONIZATION NETWORK DOMAINS

(71) Applicant: Moxa Inc., New Taipei City (TW)

(72) Inventors: Yi-Feng Lu, New Taipei City (TW); Chien-Yu Lai, New Taipei City (TW); Chi-Chuan Liu, New Taipei City (TW); Po-Hung Lin, New Taipei City (TW); Hou-Chen Liu, New Taipei City (TW)

(73) Assignee: Moxa Inc., New Taipei City (TW)

( * ) Notice: Subject to any disclaimer, the term of this patent is extended or adjusted under 35 U.S.C. 154(b) by 406 days.

(21) Appl. No.: 18/429,451

(22) Filed: Feb. 1, 2024

(65) Prior Publication Data

US 2025/0132851 A1 Apr. 24, 2025

Related U.S. Application Data

(60) Provisional application No. 63/544,644, filed on Oct. 18, 2023.

(51) Int. Cl.
*H04J 3/06* (2006.01)
*H04L 7/027* (2006.01)
(Continued)

(52) U.S. Cl.
CPC .......... *H04J 3/0644* (2013.01); *H04J 3/0658* (2013.01); *H04J 3/0667* (2013.01); *H04J 3/0685* (2013.01);
(Continued)

(58) Field of Classification Search
CPC ...... H04J 3/0667; H04J 3/0658; H04J 3/0685; H04L 49/111; H04L 61/2517; H04L 7/027
See application file for complete search history.

(56) References Cited

U.S. PATENT DOCUMENTS

2019/0007151 A1* 1/2019 Goel ................. H04W 56/0015
2020/0412471 A1* 12/2020 Gareau ................. H04J 3/0697
(Continued)

FOREIGN PATENT DOCUMENTS

| | | | |
|---|---|---|---|
| CN | 111245549 | A | 6/2020 |
| EP | 3 140 932 | B1 | 5/2018 |
| WO | 2023/151794 | A1 | 8/2023 |

OTHER PUBLICATIONS

"IEEE Standard for a Precision Clock Synchronization Protocol for Networked Measurement and Control Systems," in IEEE Std 1588-2019 (Revision of IEEE Std 1588-2008) , vol. No., pp. 1-499, Jun. 16, 2020, (Year: 2020).*
(Continued)

*Primary Examiner* — Salvador E Rivas
(74) *Attorney, Agent, or Firm* — Winston Hsu

(57) ABSTRACT

A time synchronization method used for a time synchronization device is provided. The time synchronization device runs a plurality of Precision Time Protocol (PTP) instances to connect to a plurality of time synchronization domains through a plurality of ports. The time synchronization method includes selecting a grandmaster (GM) clock from the plurality of time synchronization domains; updating clock information of the grandmaster clock; determining whether each of the plurality of ports is a time receiving port or a time transmitting port according to the grandmaster clock; modifying clock attributes of each of the plurality of PTP instances according to whether the corresponding port is the time receiving port or the time transmitting port; and synchronizing, by the plurality of PTP instances, timings of the plurality of time synchronization domains according to the grandmaster clock.

28 Claims, 10 Drawing Sheets

(51) Int. Cl.
*H04L 49/111* (2022.01)
*H04L 61/2517* (2022.01)

(52) U.S. Cl.
CPC ............. *H04L 7/027* (2013.01); *H04L 49/111* (2022.05); *H04L 61/2517* (2013.01)

(56) References Cited

U.S. PATENT DOCUMENTS

| | | | | |
|---|---|---|---|---|
| 2022/0030533 | A1 | 1/2022 | Munz | |
| 2022/0095153 | A1 | 3/2022 | Ha | |
| 2022/0123849 | A1 | 4/2022 | McCall | |
| 2022/0376808 | A1* | 11/2022 | Zinner | H04J 3/0667 |
| 2022/0394647 | A1* | 12/2022 | Moon | H04J 3/0667 |
| 2023/0171725 | A1* | 6/2023 | Singh | H04W 56/0045 370/350 |
| 2023/0291489 | A1* | 9/2023 | Li | H04J 3/0641 |
| 2023/0388949 | A1* | 11/2023 | Chen | H04J 3/0679 |

OTHER PUBLICATIONS

3GPP,."Technical Specification, 3rd Generation Partnership Project; Technical Specification Group Services and System Aspects; System architecture for the 5G System (5GS); Stage 2 (Release 18)",.3GPP TS 23.501 V18.3.0.(Sep. 2023),pp. 1-686. ,Sep. 2023.

IEEE Instrumentation and Measurement Society. 1588-2008—IEEE Standard for a Precision Clock Synchronization Protocol for Networked Measurement and Control System.IEEE.Jul. 24, 2008. , Jul. 24, 2008.

Silvana Rodrigues et al., Synchronization in Time-Sensitive Networking: an Introduction to IEEE STD 802.1AS, IEEE Communications Standards Magazine, Dec. 2022, pp. 14-20, XP011933822 ,Dec. 2022.

IEEE Standard for a Precision Clock Synchronization Protocol for Networked Measurement and Control Systems, IEEE Instrumentation and Measurement Society, Developed by the Technical Committee on Sensor Technology (TC-9), IEEE Std 1588-2019 (Revision of IEEE Std 1588-2008), 2020 IEEE, XP068168211 ,2020.

"Proposal of multiple time synchronization profile distribution method using profile transformation" by Keisuke Yamagata et al., a collection 2 of literatures at a communication society meeting 2022 conducted on Aug. 23, 2022 by the Institute of Electronics, Information, and Communication, p. 73 ,Aug. 23, 2022.

"Study of a distribution method for multiple time synchronization profiles" by Keisuke Yamagata et al., a collection of literatures gategorized into communication 2 at a general meeting 2022 conducted on Mar. 1, 2022 by the Institute of Electronics, Information, and Communication, p. 143 ,Mar. 1, 2022.

* cited by examiner

TIME SYNCHRONIZATION METHOD AND TIME SYNCHRONIZATION DEVICE FOR MULTIPLE TIME SYNCHRONIZATION NETWORK DOMAINS

CROSS REFERENCE TO RELATED APPLICATIONS

This application claims the benefit of U.S. Provisional Application No. 63/544,644, filed on Oct. 18, 2023. The content of the application is incorporated herein by reference.

BACKGROUND OF THE INVENTION

1. Field of the Invention

The present invention relates to a method and a device for time synchronization, and more particularly, to a method and a device for time synchronization in multiple time synchronization network domains.

2. Description of the Prior Art

Precision Time Protocol (PTP) is a standard for time synchronization defined by IEEE 1588, and is used to achieve high-precision time synchronization throughout a time-critical network. As the market evolves, different network applications have unique requirements. To address this, many different PTP profiles have been proposed for different applications, such as Power Profile (IEEE Std C37.238) for power networks, Telecom Profile (ITU-T G.8265.1) for telecommunication networks, and Generalized Precision Time Protocol (gPTP, IEEE Std 802.1AS). PTP profiles allow applications in different fields to set specific operating parameters, attributes, and default values to meet their requirements. However, this can make it difficult for devices and networks using different PTP profiles to communicate effectively. In general, in order to ensure time synchronization, apparatuses or devices in the same environment must use the same PTP profile, making cross-domain time integration challenging.

The conventional technology integrates multiple types of PTP profiles through a time gateway so that different time synchronization domains or devices using different types of PTP profiles may synchronize time according to one grandmaster (GM) clock thereof. Accordingly, time synchronization is achieved between time synchronization domains with different types of PTP profiles.

However, when performing time synchronization, various profiles or machines may employ different verification mechanisms. Thus, during time synchronization across network domains with different types of PTP profiles, the time synchronization method may not operate smoothly due to different verification mechanisms.

SUMMARY OF THE INVENTION

The present invention therefore provides a method and a device for successfully passing the verification mechanism when synchronizing time across multiple devices or network domains that use different types of PTP profiles, so as to overcome the shortcoming of the prior art.

An embodiment of the present invention discloses a time synchronization method for a time synchronization device, where the time synchronization device runs a plurality of Precision Time Protocol (PTP) instances to connect to a plurality of time synchronization domains through a plurality of ports. The time synchronization method includes obtaining a grandmaster (GM) clock from the plurality of time synchronization domains; updating clock information of the grandmaster clock; determining whether each of the plurality of ports is a time receiving port or a time transmitting port according to the grandmaster clock; modifying clock attributes of each of the plurality of PTP instances according to whether the corresponding port is the time receiving port or the time transmitting port; and synchronizing, by the plurality of PTP instances, timings of the plurality of time synchronization domains according to the grandmaster clock.

An embodiment of the present invention further discloses a time synchronization device. The time synchronization device is configured to run a plurality of PTP instances to connect to a plurality of time synchronization domains through a plurality of ports, and includes a processing unit and a storage unit. The processing unit is configured to execute a program code. The storage unit, coupled to the processing unit, is configured to store the program code to instruct the processing unit to execute a time synchronization method. The time synchronization method includes obtaining a grandmaster clock from the plurality of time synchronization domains; updating clock information of the grandmaster clock; determining whether each of the plurality of ports is a time receiving port or a time transmitting port according to the grandmaster clock; modifying clock attributes of each of the plurality of PTP instances according to whether the corresponding port is the time receiving port or the time transmitting port; and synchronizing, by the plurality of PTP instances, timings of the plurality of time synchronization domains according to the grandmaster clock.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
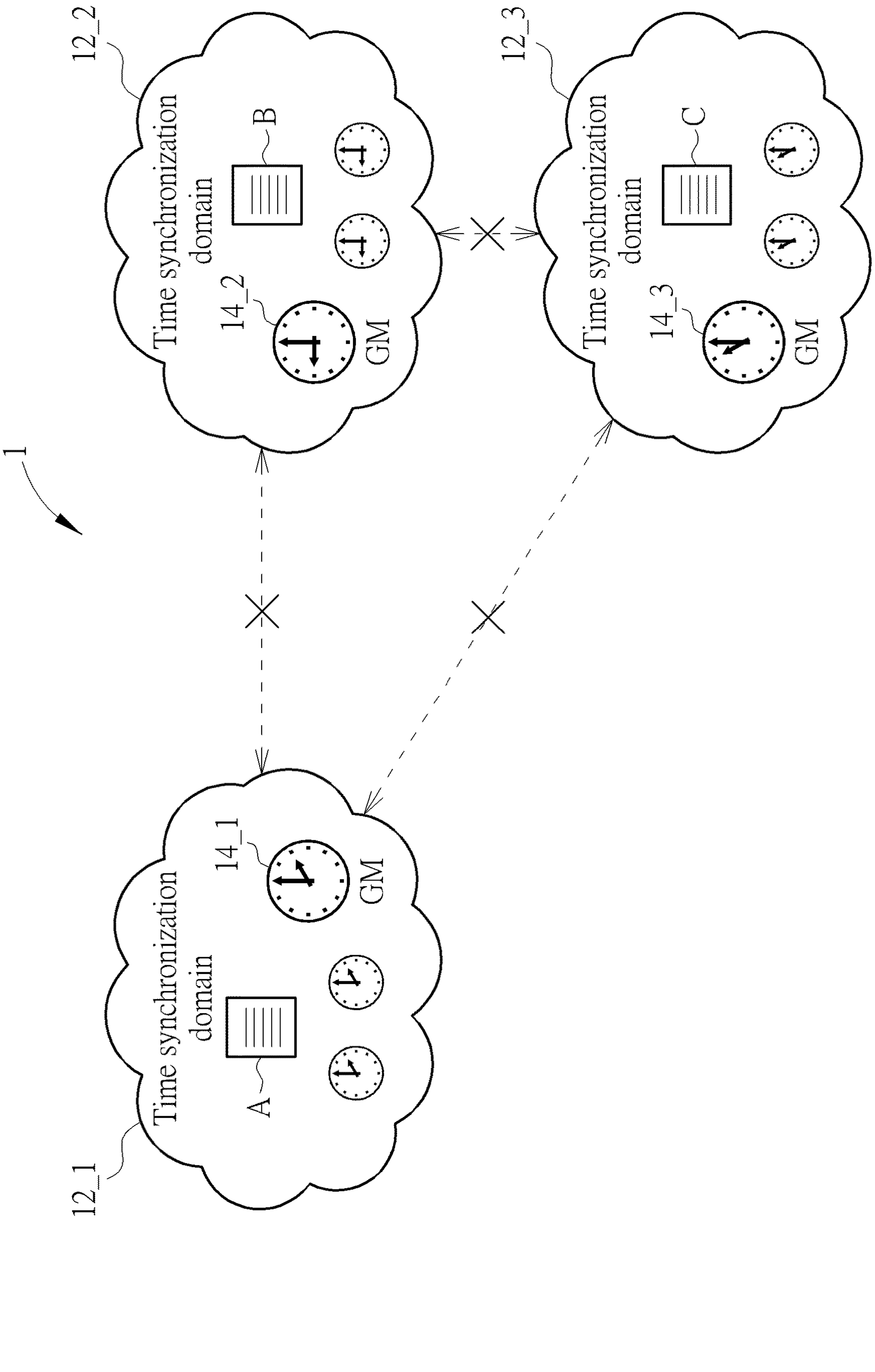
FIG. 1 is a schematic diagram of a network system.

Please refer to FIG. 1, which is a schematic diagram of a network system 1. The network system 1 comprises time synchronization domains 12_1-1_3, wherein each time synchronization domain may be a wired network, a wireless network, or a network domain composed of combinations thereof, may be a network domain composed of multiple devices, network switches and the like (including multiple clocks), or may be a network domain composed of only a single device (including merely one clock). The time synchronization domains 12_1-12_3 are respectively time synchronization domains operating according to the specifications of different types of Precision Time Protocol (PTP) profiles A-C. The PTP profiles A-C may be Telecom Profile, Power Profile, gPTP, etc., and are not limited thereto.

It should be noted that, since the time synchronization domains 12_1-12_3 operate time synchronization mechanisms according to different PTP profiles A-C, cross-domain integration for time synchronization cannot be performed in general. In this situation, each time synchronization domain may have an optimal clock (such as the optimal clocks 14_1-14_3 in FIG. 1) to run as a grandmaster (GM) clock of each time synchronization domain. In other words, devices belonging to the same network domain perform time synchronization according to the grandmaster clock of the network domain to which they belong. The optimal clock refers to the most ideal clock suitable for a specific time synchronization domain evaluated based on factors such as time source, time accuracy, and oscillator stability, and may also be a clock that is determined to be most suitable for a specific time synchronization domain by users. In this situation, when a manufacturer intends to replace or add a new device in a network domain, the new device must be compatible with the PTP profile used by the network domain; when a device manufacturer develops the device, customization and adjustment should be performed separately for different types of PTP profiles so as to be applicable in different fields; when the network domain needs to integrate with other specific time synchronization domains, updates for all the apparatuses and network devices may be required to be compatible with the generalized Precision Time Protocol (gPTP) profile.

To address the above issues, the conventional technology integrates multiple types of PTP profiles through a time synchronization device so that different time synchronization domains or devices using different types of PTP profiles may synchronize time according to a grandmaster (GM) clock thereof, which realizing the cross-domain time synchronization.

Figure 2:
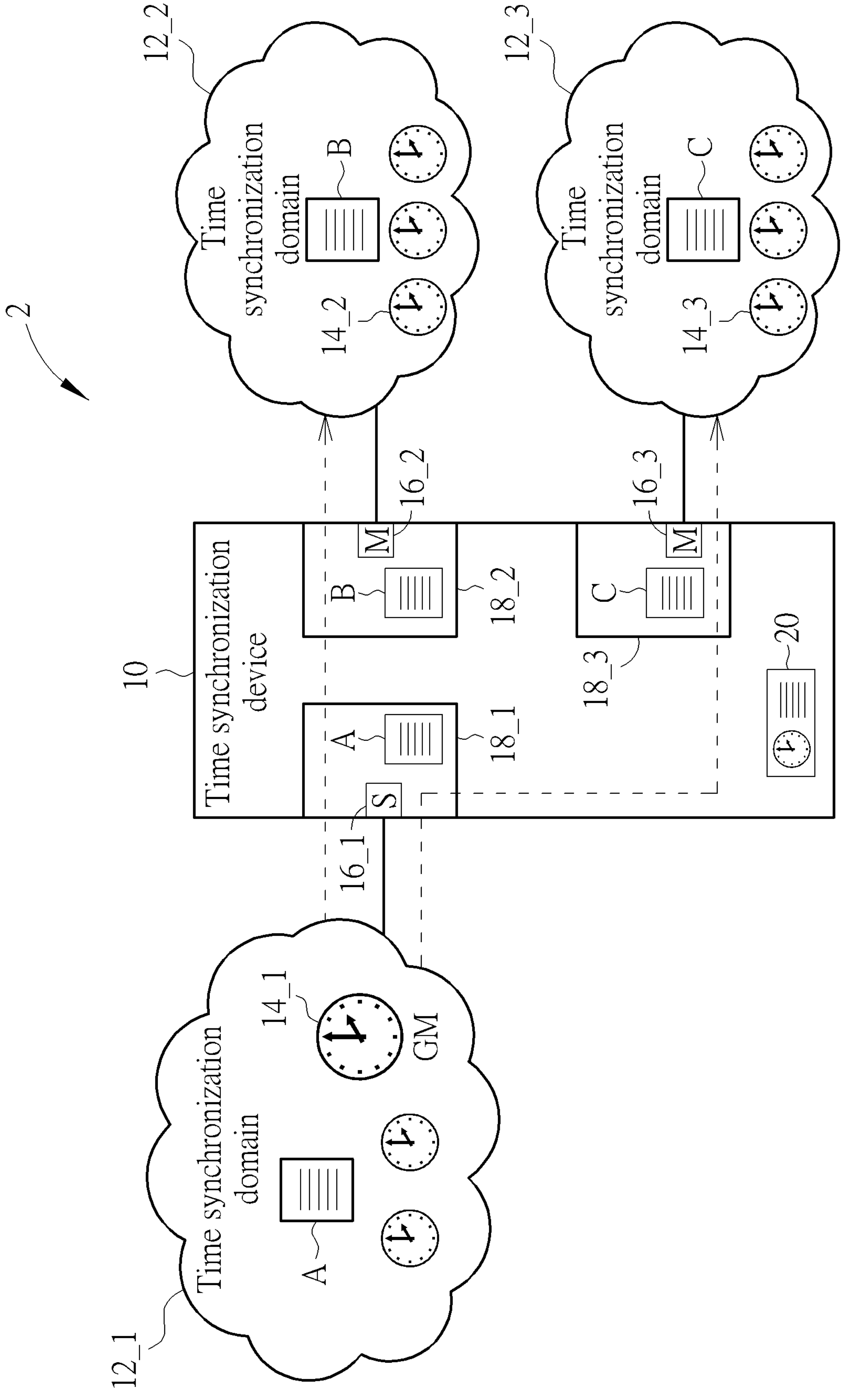
FIG. 2 is a schematic diagram of a time synchronization network system according to an embodiment of the present invention.

Please refer to FIG. 2, which is a schematic diagram of a time synchronization network system 2 according to an embodiment of the present invention. The time synchronization network system 2 comprises the time synchronization domains 12_1-12_3 and a time synchronization device 10. The time synchronization device 10 may be a network device such as a gateway, a switch, a router, or a bridge, running in the network, and is not limited thereto. The time synchronization device 10 is connected to the time synchronization domains 12_1-12_3 through ports 16_1-16_3 respectively. In the time synchronization network system 2, the time synchronization domains 12_1-12-3 may perform time synchronization through the time synchronization device 10, so that all apparatuses and devices in the time synchronization domains 12_1-12_3 may be synchronized according to an optimal clock of one of the time synchronization domains 12_1-12_3. It should be noted, in the time synchronization network system 2, the number of time synchronization domains 12_1 to 12_3 is 3, which is for illustration. The time synchronization device 10 of the embodiment of the present invention may be applied to any number of time synchronization domains for time synchronization, and is not limited thereto.

Figure 3:
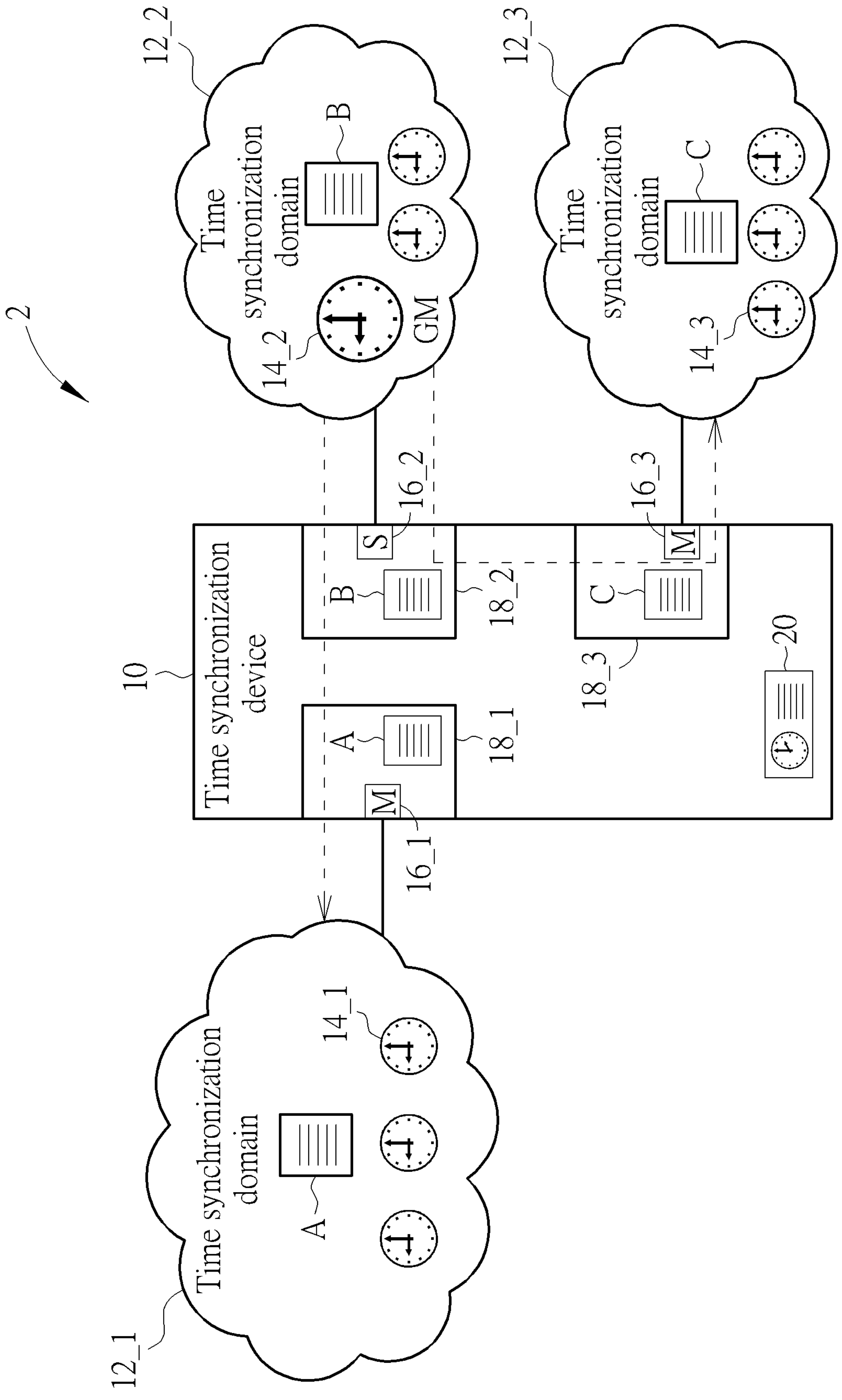
FIG. 3 is a schematic diagram of a time synchronization network system according to an embodiment of the present invention.

As shown in FIG. 2, all the apparatuses and devices in the time synchronization domains 12_1-12_3 may synchronize time with the optimal clock 14_1 (as a grandmaster clock) of the time synchronization domain 12_1 that uses PTP profile A, and is not limited thereto. For example, as shown in FIG. 3, all the apparatuses and devices in the time synchronization domains 12_1-12_3 may also synchronize time with the optimal clock 14_2 of the time synchronization domain 12_2 using PTP profile B or the optimal clock 14_3 of the time synchronization domain 12_3 using PTP profile C (not shown in the figures). It should be noted, the grandmaster clock of the time synchronization network system 2 may be designated manually or automatically determined by the time synchronization device 10 through comparing the capability information of each clock in the PTP Announce message received from each time synchronization domain 12_1-12_3. For example, the capability information of clock is about parameters such as timePropertiesDS (Time Properties Parameter Data Set), parentDS (Parent Parameter Data Set) or the corresponding priority vector (Time-synchronization Spanning Tree Priority Vector), and is not limited to these. In this embodiment, when the grandmaster clock 14_1 fails, a new grandmaster clock may be immediately determined by the time synchronization device 10 from the optimal clocks 14_2, 14_3 or the other clocks of the time synchronization domain 12_1 to maintain the time synchronization.

In the present embodiment, the time synchronization device 10 builds PTP instances 18_1-18_3 for the ports 16_1-16_3 respectively so as to process the time synchronization for the time synchronization domains 12_1-12_3. Each PTP instance of the PTP instances 18_1-18_3 should use the same type of PTP profile corresponding to the time synchronization domain connected by the corresponding port. For example, the PTP instance 18_1 for the port 16_1 uses the PTP profile A to communicate with the time synchronization domain 12_1, the PTP instance 18_2 for the port 16_2 uses the PTP profile B to communicate with the time synchronization domain 12_2, and the PTP instance 18_3 for the port 16_3 uses the PTP profile C to communicate with the time synchronization domain 12_3. Accordingly, each of the PTP instances 18_1-18_3 serves as a communication medium between the time synchronization device 10 and the time synchronization domains 12_1-12_3 according to the corresponding PTP profiles A-C, and the time synchronization device 10 is capable of exchanging PTP messages with the connected time synchronization domains 12_1-12_3. In other words, each of the PTP instances 18_1-18_3 operates according to the PTP profile used by the corresponding time synchronization domain and runs as one node of the corresponding time synchronization domain.

Take the time synchronization network system 2 in FIG. 2 as an example. Specifically, all the devices and apparatus in the time synchronization network system 2 synchronize time with the grandmaster clock 14_1. The port 16_1 is a time receiving port for receiving clock information such as the clock attributes and time and has a port state (portState) set to be SlavePort according to the specification of PTP (marked as S); the ports 16_2 and 16_3 are time transmitting ports for transmitting information such as clock attributes and time and have port states (portState) set to be MasterPort (marked as M). The time synchronization device 10 receives PTP messages about the grandmaster clock 14_1 via the port 16_1 and processes the PTP messages with the PTP instance 18_1. After obtaining the clock information of the grandmaster 14_1 from the PTP instance 18_1, the time synchronization device 10 performs information conversion on the clock information according to the PTP profiles B and C. Then, the PTP instances 18_2 and 18_3 transmit the clock information to the time synchronization domains 12_2 and 12_3 through the ports 16_2 and 16_3 according to the PTP profiles B and C respectively. Accordingly, devices of the time synchronization domains 12_2 and 12_3 may receive the clock information of the grandmaster clock 14_1, so as to realize the time synchronization for the time synchronization network system 2.

Figure 4:
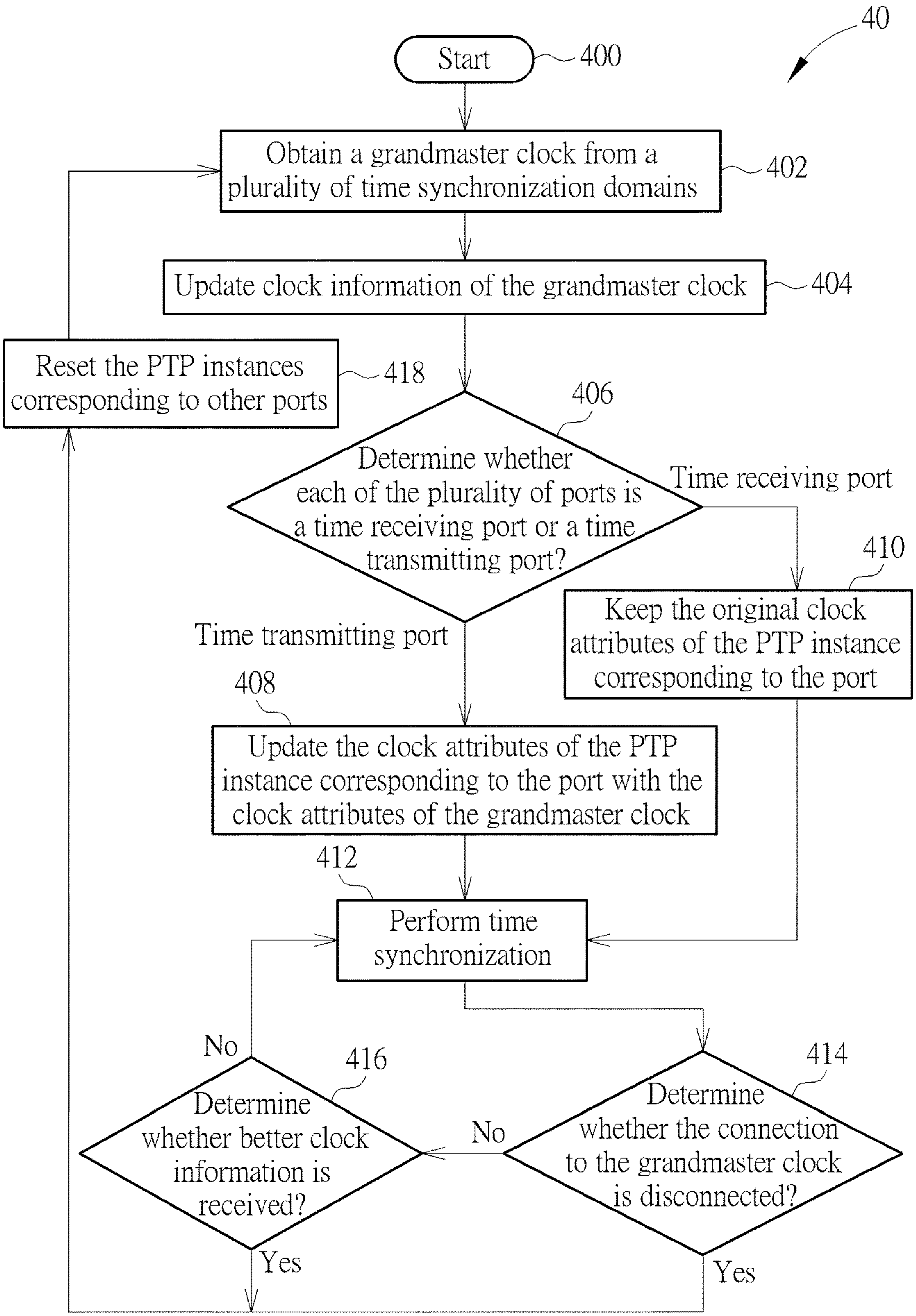
FIG. 4 is a schematic diagram of a time synchronization process according to an embodiment of the present invention.

In practice, devices produced by various manufacturers and devices using different types of PTP profiles may have different verification mechanisms when performing time synchronization. Due to the different verification mechanisms, the PTP messages carrying the clock information may be rejected and thus the time synchronization may not be operated successfully. Therefore, the time synchronization device 10 in the embodiment of the present invention runs as a virtual grandmaster clock according to a time synchronization method, so that all devices in the time synchronization network system 2 may regard the time synchronization device 10 as a grandmaster clock running in the same time synchronization domain. The time synchronization method may be summarized into a time synchronization process 40 shown in FIG. 4. The time synchronization process 40 comprises the following steps:

Step 400: Start.

Step 402: Obtain a grandmaster clock from a plurality of time synchronization domains.

Step 404: Update clock information of the grandmaster clock.

Step 406: Determine whether each of the plurality of ports is a time receiving port or a time transmitting port according to the grandmaster clock. If the port is the time transmitting port, proceed to Step 408; otherwise, proceed to Step 410.

Step 408: Update the clock attributes of the PTP instance corresponding to the port with the clock attributes of the grandmaster clock.

Step 410: Keep the original clock attributes of the PTP instance corresponding to the port.

Step 412: Perform time synchronization.

Step 414: Determine whether the connection to the grandmaster clock is disconnected. If yes, proceed to Step 418; otherwise, proceed to Step 416.

Step 416: Determine whether better clock information is received. If yes, proceed to Step 418; otherwise, proceed to Step 412.

Step 418: Reset the PTP instances corresponding to other ports.

According to the time synchronization process 40, the time synchronization device 10 first determines a new grandmaster clock from the time synchronization domains 12_1-12-3 for the time synchronization network system 2 (Step 402), and then updates the clock information of the grandmaster clock comprising the clock ID (clockIdentity) of the grandmaster clock (Step 404). Next, the time synchronization device 10 checks each port of the ports 16_1-16_3 one by one to determine whether the port is a time receiving port or a time transmitting port (Step 406). If the port is the time receiving port, the corresponding PTP instance may keep the original clock attributes (Step 410); if the port is the time transmitting port, the time synchronization device 10 may update the clock attributes of the corresponding PTP instance with the clock information of the grandmaster clock (Step 408). Finally, the time synchronization device 10 performs time synchronization (Step 412), and keeps monitoring the connection of the grandmaster clock (Step 414). If the connection to the grandmaster clock is disconnected, the time synchronization device 10 resets the PTP instances (Step 418) and reselects a new grandmaster clock for the time synchronization network system 2 (Step 402). During the processes, the PTP instances 18_1-18_3 continuously listen to the PTP messages. If one of the PTP instances receives a PTP Announce message with a new clock better than the corresponding optimal clock (Step 416), the time synchronization device 10 may reset the other PTP instances (Step 418) and reselect a new grandmaster clock for the time synchronization network system 2 (Step 402). Accordingly, the time synchronization device 10 integrates the time for all devices in the time synchronization network system 2.

Referring to FIG. 2, the time synchronization device 10 determines the optimal clock 14_1 of the time synchronization domain 12_1 to be the grandmaster clock in Step 402, and then updates a clock information of the grandmaster clock 20 with the clock information of the grandmaster clock 14_1 in Step 404. Then, the time synchronization device 10 may check each port of the ports 16_1-16_3 one by one, and determine that the port 16_1 is a time receiving port and the ports 16_2 and 16_3 are time transmitting ports in Step 406. According to Steps 408 and 410, the time synchronization device 10 updates the clock attributes of the PTP instances 18_2 and 18_3 with the clock attributes of the grandmaster clock 14_1, and keeps the original clock attributes of the PTP instance 18_1. Finally, the PTP instances 18_1-18_3 synchronize timings of the time synchronization domains 12_1-12_3 according to the grandmaster clock 14_1. It should be noted that if the grandmaster clock 14_1 is disconnected, the time synchronization device 10 may reset the information of the PTP instances 18_1-18_3 in Step 418 and reselect a new grandmaster clock such as the optimal clock 14_2 in FIG. 3 in Step 402. In addition, if one of the PTP instances 18_1-18_3 receives a PTP Announce message with a clock better than the corresponding optimal clocks 14_1-14_3, the time synchronization device 10 may reset the other PTP instances in Step 418 and reselect a new grandmaster clock again.

According to the time synchronization process 40, in Step 402, the time synchronization device 10 obtains the grandmaster clock from time synchronization domains 12_1-12_3. Specifically, the time synchronization device 10 may select the grandmaster clock from the optimal clocks 14_1-14_3 by comparing priority vectors of the clocks, and the optimal clocks 14_1-14_3 are determined according to a best master clock algorithm (BMCA) or designated manually. The priority vectors of clocks are included in the clock information and received by the PTP instances 18_1-18_3 via PTP message. The time synchronization device 10 determines a best clock among the optimal clocks 14_1-14_3 to be the grandmaster clock.

In Step 404, the time synchronization device 10 updates the clock information of the grandmaster clock 20 with the clock information of the grandmaster clock 14_1. The clock information comprises the capability information, time and clock ID as mentioned above and is not limited thereto. The time synchronization device 10 may perform information conversion on the clock information of the grandmaster clock 14_1 according to different PTP profiles. For example, the clock information of the grandmaster clock 14_1 may be converted to comply with the format of the PTP profiles B and C and passed to the PTP instances 18_2 and 18_3 respectively.

In Step 406, the time synchronization device 10 determines whether each of the plurality of ports is a time receiving port or a time transmitting port according to the receiving PTP messages. Specifically, PTP standard supports two modes of operations: one-step mode and two-step mode. In the one-step mode, a transmission timestamp is updated in time and carried in the sync message on the fly, which is a hardware-based method and requires fewer messages. In the two-step mode, in addition to a sync message, an additional follow-up message containing transmission time of the preceding message is transmitted, which is software-proceeded method. In the present embodiment, both of the one-step mode and the two-step mode are applicable. In the present embodiment, while operating with the one-step mode, the port receiving the PTP messages Sync is determined to be the time receiving port; otherwise, it is determined to be the time transmitting port. On the other hand, while operating with the two-step mode, the port receiving the PTP messages Sync or Follow_Up is determined to be the time receiving port; otherwise, it is determined to be the time transmitting port. Therefore, the port 16_1 is the time receiving port because it receives the Sync message in the one-step mode or it receives the Sync message or the Follow_Up message in the two-step mode from the time synchronization domain 12_1, and the ports 16_2 and 16_3 are the time transmitting ports.

In Steps 408 and 410, the time synchronization device 10 modifies the clock attributes of each of the PTP instances 18_1-18_3 according to whether the corresponding port is the time receiving port or the time transmitting port. The time synchronization device 10 updates the clock attributes such as the clock IDs of the PTP instances 18_2 and 18_3 corresponding to the time transmitting ports 16_2 and 16_3 with the clock attributes of the grandmaster clock 14_1, and thereby the PTP instances 18_2 and 18_3 may send PTP message with the clock attributes such as the clock ID of grandmaster clock 14_1 via the time transmitting ports 16_2 and 16_3. In other words, the PTP messages sent by the PTP instances 18_2 and 18_3 are just like the PTP messages sent by the grandmaster clock 14_1, and the time synchronization device 10 may be regarded as the grandmaster clock for the devices in the time synchronization domains 12_2 and 12_3. In addition, the clock attributes of the PTP instance 18_1 may be kept because the corresponding port 16_1 is the time receiving port that is responsible for receiving the clock information of the grandmaster clock 14_1.

In Step 412, the time synchronization device 10 performs time synchronization. Specifically, the PTP instances 18_2 and 18_3 corresponding to the time transmitting ports 16_2 and 16_3 may transmit PTP messages with the clock information of the grandmaster clock 14_1 obtained from the PTP instance 18_1 corresponding to the time receiving port 16_1. The clock information is converted by the time synchronization device 10 according to the PTP profiles B and C respectively and thus available for the time synchronization domains 12_2 and 12_3.

As mentioned above, the time synchronization device 10 connects three time synchronization domains 12_1-12_3 using different PTP profiles, where the time synchronization device 10 receives information from the grandmaster clock 14_1 of the time synchronization domain 12_1 and plays a role of grandmaster clock in the time synchronization domains 12_2 and 12_3. As a virtual grandmaster clock for the time synchronization domains 12_2 and 12_3, the time synchronization device 10 may send PTP messages using the information of the grandmaster clock 14_1 such as the clock ID, so that the devices in the time synchronization domains 12_2 and 12_3 may regard the time synchronization device 10 as the grandmaster clock 14_1 and synchronize the time therewith. Furthermore, the time synchronization device 10 may further modify some specific fields in the PTP messages to overcome the various verification mechanisms for the grandmaster clock designed by different manufacturers. For example, the fields such as "correctionField" or "cumulativeRateRatio" in PTP Sync and Follow_Up messages may be reset to 0; the field "localStepsRemoved" of PTP Announce message may be assigned the value of 0; the "pathTrace" array of the PTP Announce TLV may only keep the clock ID of the grandmaster 14_1. According to different verification mechanisms, different fields in PTP messages may need to be modified and are not limited thereto. It should be noted, although the time synchronization device 10 achieves the effect of running like a virtual grandmaster clock by modifying the PTP message content, there are some specific message fields that need to be used to communicate with the connected device and do not need to be modified, such as "sourcePortIdentity", "sequenceId", "twoStepFlag" and "logMessageInterval". Accordingly, the devices in the time synchronization domains 12_2 and 12_3 may synchronize the time with the grandmaster clock 14_1 according to the content of the PTP messages received from the time synchronization device 10.

In Steps 414 to 418, the time synchronization device 10 keeps monitoring the PTP messages from the time synchronization domains 12_1-12_3. It is possible that the grandmaster clock 14_1 fails or a clock better than the grandmaster clock 14_1 appears during the time synchronization process 40, and the time synchronization device 10 may reset the PTP instances and reselect a new grandmaster clock for the time synchronization network system 2 in these situations. In Step 414, when losing the connection with the grandmaster clock 14_1, the time synchronization device 10 may reset the PTP instances 18_1-18_3 and then start to select a new grandmaster clock in Step 402. In Step 416, if one of the PTP instances 18_1-18_3 receives a PTP Announce message of a clock better than the corresponding optimal clock, the time synchronization device 10 may reset the other PTP instances and start to select a new grandmaster clock in Step 402. For example, if the PTP instance 18_3 receives a PTP Announce message of a clock better than the optimal clock 14_3, the time synchronization device 10 may reset the PTP instance 18_1 and 18_2 and reselect the grandmaster clock according to Step 402.

Accordingly, the time synchronization device 10 runs as a virtual grandmaster clock so that the devices in the time synchronization domains 12_2 and 12_3 may consider the time synchronization device 10 to be the grandmaster clock 14_1 and synchronize time therewith.

Figure 5A:
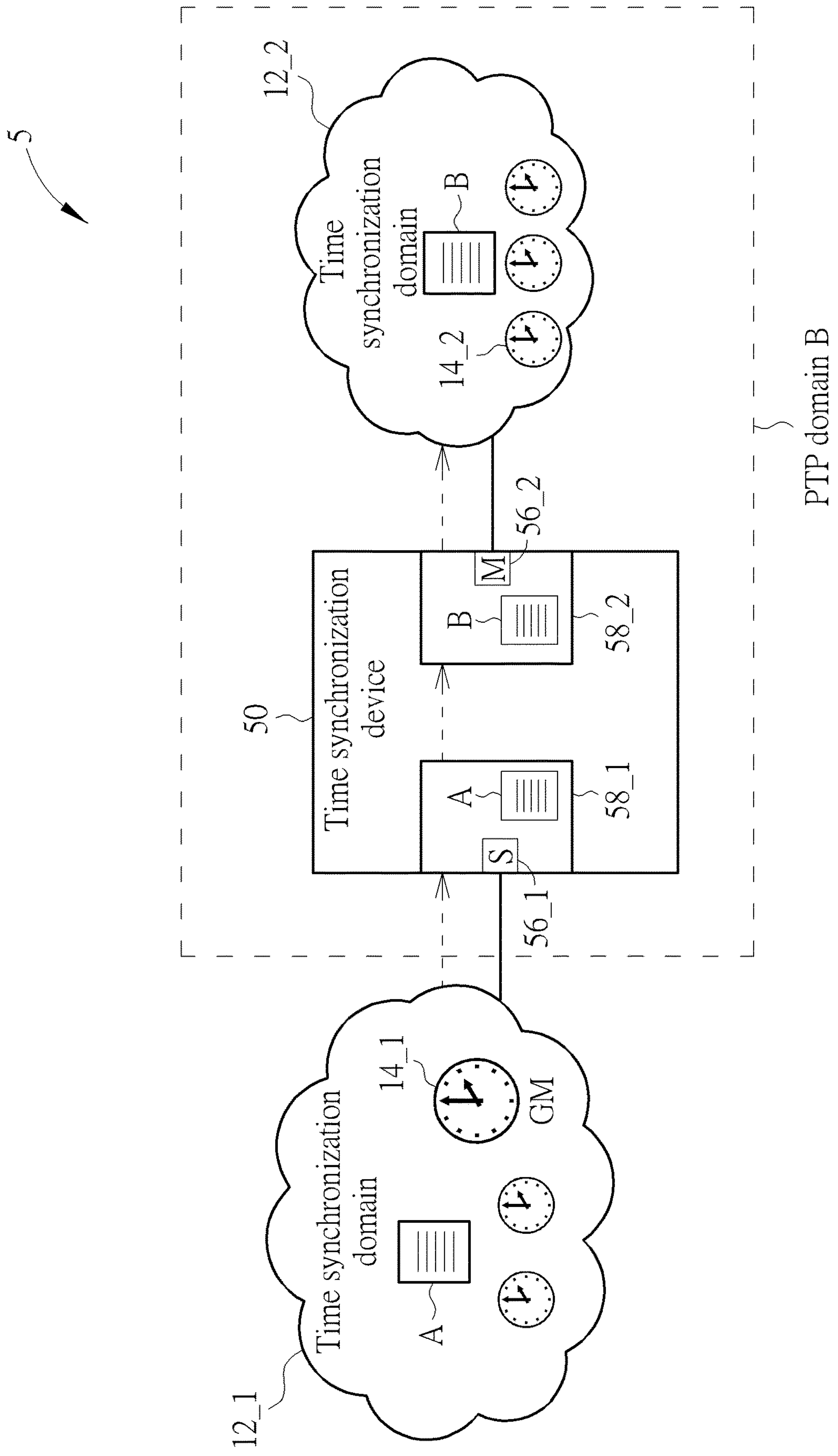
FIG. 5A and FIG. 5B are schematic diagrams of a time synchronization network system with one time synchronization device according to an embodiment of the present invention.

Please refer to FIG. 5A, which is a schematic diagram of a time synchronization network system 5 according to an embodiment of the present invention. The time synchronization network system 5 comprises the time synchronization domains 12_1-12_2 and a time synchronization device 50. As shown in FIG. 5A, the time synchronization device 50 builds PTP instances 58_1 and 58_2 to connect to the time synchronization domains 12_1 and 12_2 through ports 56_1 and 56_2 according to the PTP profiles A and B. The time synchronization device 50 receives time information of the grandmaster clock 14_1 through the time receiving port 56_1 (i.e., the portState is set to be SlavePort, marked as S) according to the PTP profile A. After converting the clock information, the time synchronization device 50 transmits the time information to the time synchronization domain 12_2 through the time transmitting port 56_2 (i.e., the portState is set to be MasterPort, marked as M) according to the PTP profile B.

Figure 5B:
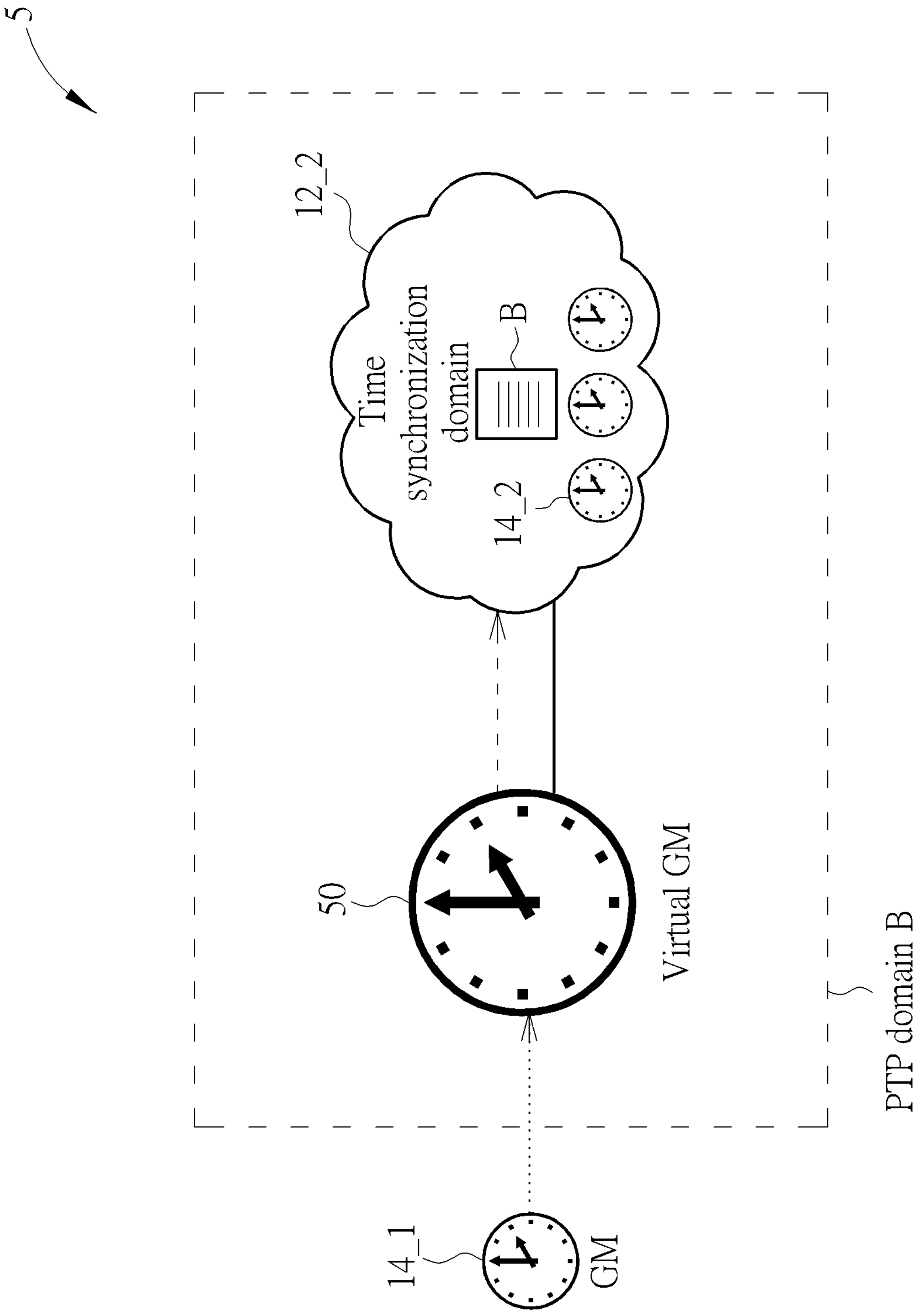

For devices in the time synchronization domain 12_2, the time synchronization device 50 and the time synchronization domain 12_2 form a PTP domain B as shown in FIG. 5B. The time synchronization device 50 runs as a virtual grandmaster clock, and may be regarded as a grandmaster clock in the same domain to the time synchronization domain 12_2. Accordingly, the devices in the time synchronization domain 12_2 may not sense that the grandmaster clock 14_1 actually comes from a heterogeneous domain using different PTP profile (the time synchronization domain 12_1). In other words, as shown by the dashed line in FIG. 5A, the time of the grandmaster clock 14_1 starts to be transmitted from the time synchronization domain 12_1, and reaches the time synchronization domain 12_2 after the time synchronization device 50; however, as for the time synchronization domain 12_2, the received time is the time of the virtual grandmaster clock 50 as shown by the dashed line in FIG. 5B. Therefore, the issue of time synchronization failure due to the checking mechanism is avoided.

In FIG. 5A and FIG. 5B, by utilizing a single time synchronization device 50 and referring to the time synchronization process 40, the time synchronization network system 5 achieves that all time synchronization domains connected to the time synchronization device 40 operate according to the time of the same grandmaster clock, so as to synchronize time. Those skilled in the art may make appropriate modifications according to the needs of the system, and are not limited thereto. For example, please refer to FIG. 6A, which is a schematic diagram of a time synchronization network system 6 according to an embodiment of the present invention. In this embodiment, the time synchronization network system 6 performs time synchronization for the time synchronization domains 12_1-12_3 through two time synchronization devices 50 and 60.

Figure 6A:
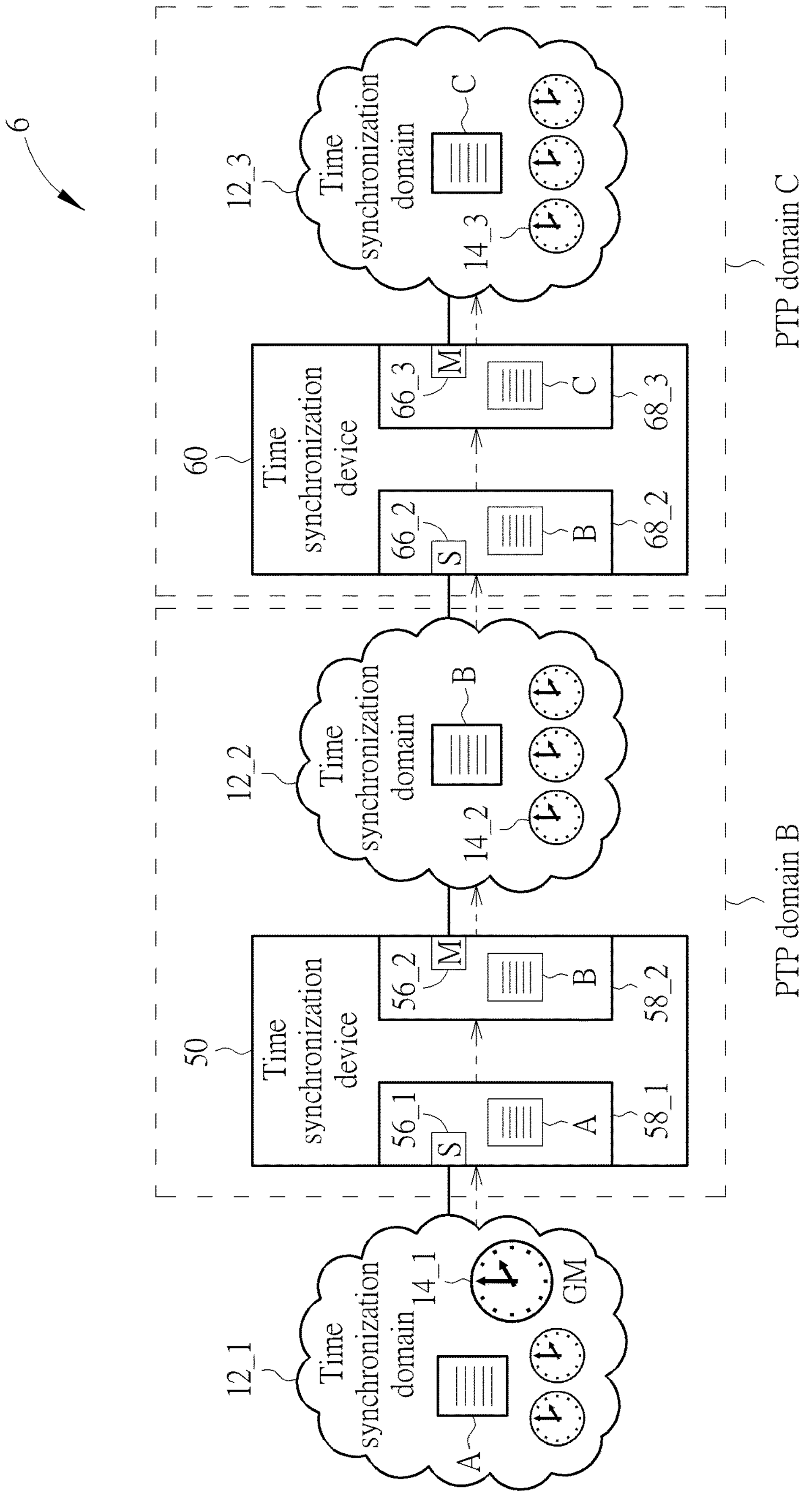
FIG. 6A and FIG. 6B are schematic diagrams of a time synchronization network system with two time synchronization devices according to an embodiment of the present invention.

As shown in FIG. 6A, the time synchronization device 60 builds PTP instances 68_2 and 68_3 to connect to the time synchronization domains 12_2 and 12_3 through ports 66_2 and 66_3 according to the PTP profiles B and C. The time synchronization device 60 receives time information of the grandmaster clock 14_1 through the time receiving port 66_2 (marked as S) according to the PTP profile B. After converting the clock information, the time synchronization device 60 transmits the time information to the time synchronization domain 12_3 through the time transmitting port 66_3 (marked as M) according to the PTP profile C.

Figure 6B:
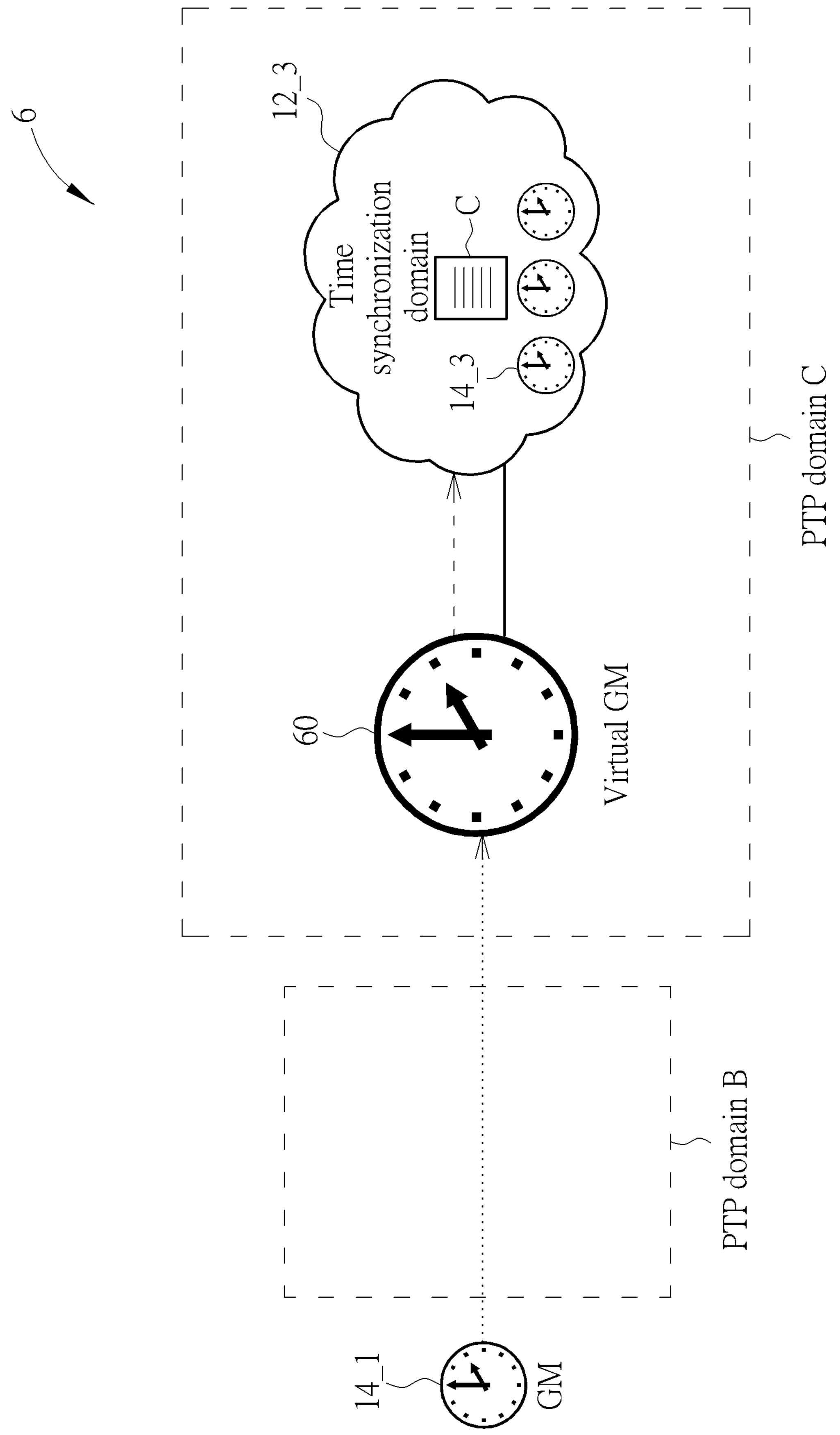

For devices in the time synchronization domain 12_3, the time synchronization device 60 and the time synchronization domain 12_3 form a PTP domain C as shown in FIG. 6A. The time synchronization device 60 runs as a virtual grandmaster clock, and may be regarded as a grandmaster clock in the same domain to the time synchronization domain 12_3. Accordingly, the devices in the time synchronization domain 12_3 may not sense that the grandmaster clock 14_1 actually comes from a heterogeneous domain using different PTP profile (the time synchronization domain 12_1). Please refer to FIG. 6B, which is another view of the time synchronization network system 6 in FIG. 6A. As shown by the dashed line in FIG. 6A, the time of the grandmaster clock 14_1 starts to be transmitted from the time synchronization domain 12_1, and reaches the time synchronization domain 12_3 after the time synchronization device 50, the time synchronization domain 12_2 and the time synchronization device 60; however, as for the time synchronization domain 12_3, the received time is the time of the virtual grandmaster clock 60 as shown by the dashed line in FIG. 6B.

In the above embodiment, the grandmaster clock is determined by the time synchronization device through the BMCA, and whether each port of the time synchronization device is a time transmitting port or a time receiving port is determined based on whether a PTP message (such as Sync or Follow_Up) related to the grandmaster clock is received. However, in an embodiment, the time synchronization network system 2 may further comprise a management device that is capable of determining the grandmaster clock. The management device may determine the grandmaster clock of the synchronization network system 2 and then determine and configure each port of the time synchronization device to be a time transmitting port or a time receiving port through an external port configuration method defined in PTP standard accordingly. In the embodiment, Step 402 and Step 406 may be skipped by the time synchronization device, and then the time synchronization device may check each port to determine whether to modify the clock attributes corresponding to the port. If the port is the time receiving port, the corresponding PTP instance may keep the original clock attributes (Step 410); if the port is the time transmitting port, the time synchronization device 10 may update the clock attributes of the corresponding PTP instance with the clock information of the grandmaster clock (Step 408). Finally, time synchronization is performed as mentioned in Step 412.

In the above embodiment, the grandmaster clock is a clock in the time synchronization domains 12_1-12_3, and the time synchronization device determines whether to modify the clock attributes of the PTP instances 18_1-18_3 according to whether the corresponding port is the time receiving port or the time transmitting port. In another embodiment, a clock of the time synchronization device may be the grandmaster clock; in other words, the time synchronization device may select the grandmaster clock among the optimal clocks 14_1-14_3 and the clock of the time synchronization device. In this situation, the grandmaster clock may not belong to any time synchronization domain connected to the time synchronization device, and the time synchronization may still be performed according to the time synchronization process 40.

Figure 7:
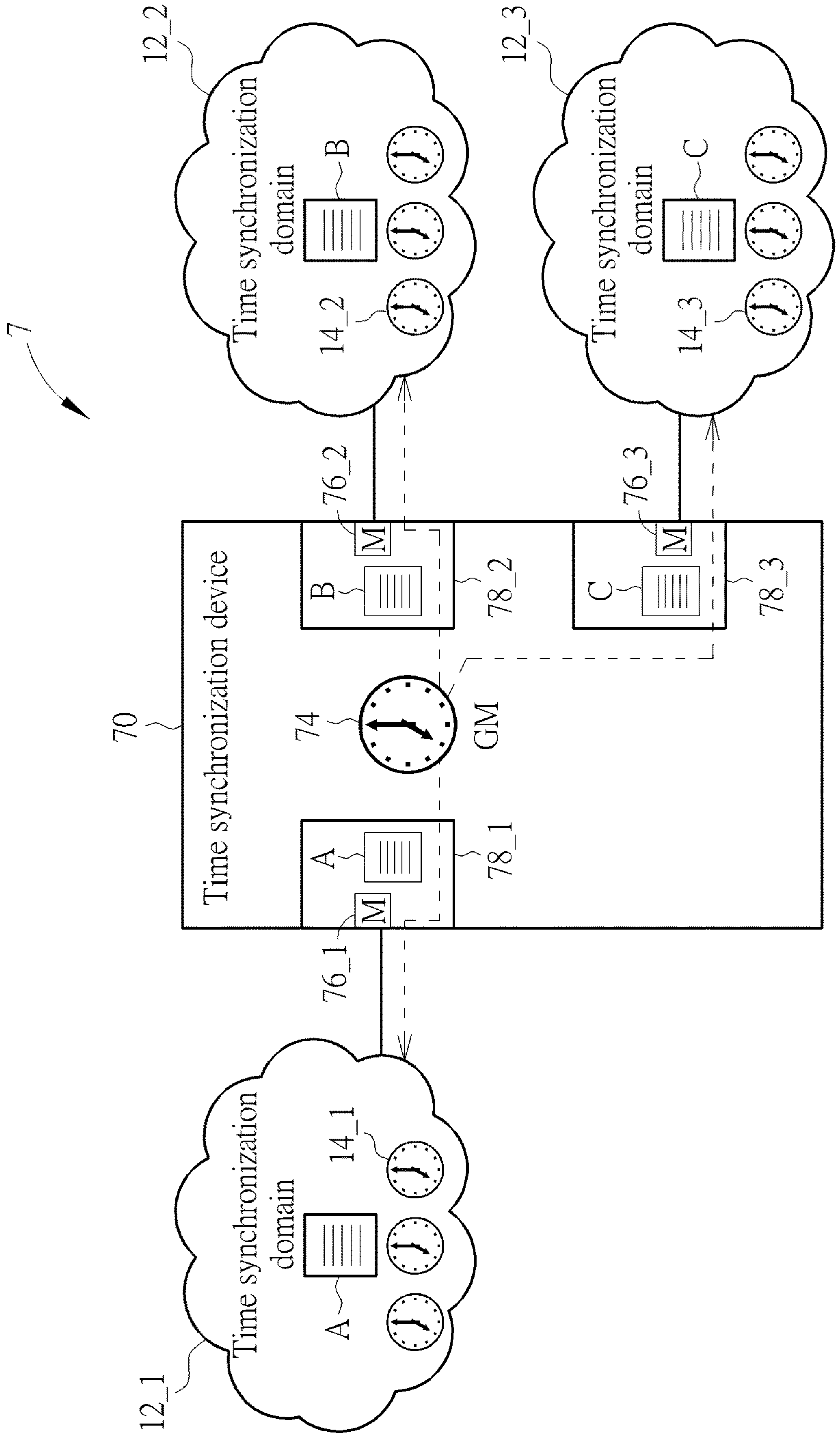
FIG. 7 is a schematic diagram of a time synchronization network system for synchronizing with the time of a time synchronization device according to an embodiment of the present invention.

Please refer to FIG. 7, which is a schematic diagram of a time synchronization network system 7 according to an embodiment of the present invention. The time synchronization network system 7 comprises the time synchronization domains 12_1-12_3 and a time synchronization device 70. As shown in FIG. 7, the time synchronization device 70 builds PTP instances 78_1-78_3 to connect to the time synchronization domains 12_1-12_3 through ports 76_1-76_3 according to the PTP profiles A-C respectively. In this embodiment, the time synchronization network system 7 takes a clock 74 of the time synchronization device 70 as the grandmaster clock and accordingly synchronizes the time for time synchronization domains 12_1-12_3. According to the time synchronization process 40, the time synchronization device 70 selects the clock 74 as the grandmaster clock in Step 402 and then updates the clock information of the grandmaster clock in Step 404. In should be noted, the grandmaster clock 74 does not belong to any of the time synchronization domains 12_1-12_3 and the time information of the grandmaster clock 74 should be transmitted to all of the time synchronization domains 12_1-12_3. Thus, in this embodiment, the time synchronization device 70 should determine all the ports 76_1-76_3 to be the time transmitting port (marked as M). In addition, since the grandmaster clock 74 is located in the time synchronization device 70, the PTP instances 78_1-78_3 may use the original clock attributes to send PTP messages without modification. In other words, the time synchronization device 70 may skip Steps 406-410 to determine all the ports 76_1-76_3 to be the time transmitting ports and proceed to Step 412 to perform time synchronization directly. Similar to the above embodiments, the time synchronization device 70 may perform information conversion on the clock information of the grandmaster clock 74 according to different PTP profiles A-C and then transmit the clock information to the time synchronization domains 12_1-12_3 respectively in Step 412.

Figure 8:
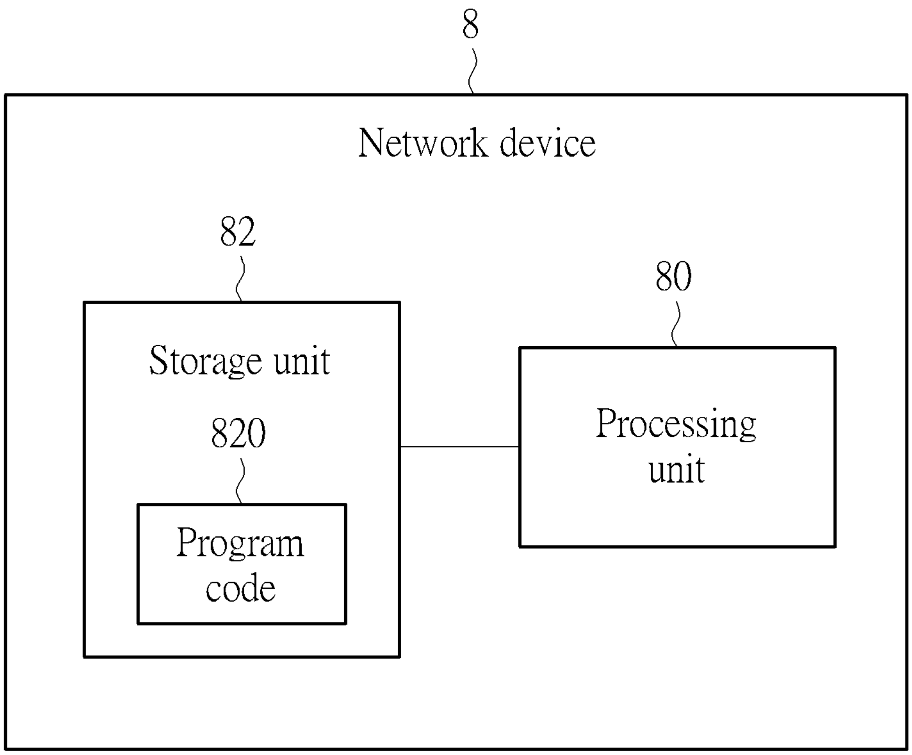
FIG. 8 is a schematic diagram of a network device according to an embodiment of the present invention.

Furthermore, please refer to FIG. 8, which is a schematic diagram of a network device 8 according to an embodiment of the present invention. The network device 8 may be and not limited to network devices such as gateways, switches, routers, and bridges running in the time synchronization domain, and is used to implement the time synchronization devices 10, 50, 60 and 70. As shown in FIG. 8, the network device 8 may comprise a processing unit 80 and a storage unit 82. The processing unit 80 may be a microprocessor or an application-specific integrated circuit (ASIC). The storage unit 82 may be any type of data storage devices for storing a program code 820, and the program code 820 is read and executed by the processing unit 80. For example, the storage unit 104 may be a read-only memory (ROM), a flash memory, a random-access memory (RAM), a hard disk, an optical data storage device, a non-volatile storage unit, etc., and is not limited thereto.

The network device 8 is used to represent the necessary components required to implement the embodiments of the present invention, and those skilled in the art may make various modifications and adjustments accordingly, and is not limited to this. For example, when the network device 8 is applied to implement the time synchronization device, the time synchronization process 40 may be complied into the program code 820, stored in the storage unit 82, and executed by the processing unit 80. Moreover, the storage unit 82 is also used for storing the clock information 20 and data required for running the time synchronization method, and is not limited thereto.

In the current industrial automation field, all machines are tending to be able to synchronize time with a grandmaster clock that is preset or expected by the manufacturer. Even in an environment with various PTP profiles, it is still hoped that all machines using different PTP profiles can be synchronized to the same grandmaster clock at the application level. However, the internal operation mechanisms of time synchronization for the different PTP profiles are not always the same. In order to ensure that all machines can correctly select the designated grandmaster clock for time synchronization, various verification mechanisms are applied by the manufacturers, thus hindering cross-domain time synchronization. Therefore, the virtual grandmaster clock provided by the present invention aims at allowing the time gateway to synchronize machines using different PTP profiles with the grandmaster clock just like synchronization in the same time synchronization domain using the same PTP profile. In other words, the devices may suppose that it is synchronizing time with the grandmaster clock in the same domain using the same PTP profile directly. Therefore, there will be no information errors caused by crossing different PTP profiles, nor will the verification process fail due to crossing domains using different PTP profiles. Accordingly, all machines are able to synchronize with the same grandmaster clock at the application level.

In summary, the present invention provides a method and a device for time synchronization, where a time synchronization device may run as a virtual grandmaster clock, so that the cross-domain time synchronization may overcome the problem caused by various verification mechanisms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time synchronization method, used for a time synchronization device, wherein the time synchronization device runs a plurality of Precision Time Protocol (PTP) instances to connect to a plurality of time synchronization domains through a plurality of ports, the time synchronization method comprising:

obtaining a grandmaster (GM) clock from the plurality of time synchronization domains;

updating clock information of the grandmaster clock;

determining whether each of the plurality of ports is a time receiving port or a time transmitting port according to the grandmaster clock;

modifying clock attributes of each of the plurality of PTP instances according to whether the corresponding port is the time receiving port or the time transmitting port; and synchronizing, by the plurality of PTP instances, timings of the plurality of time synchronization domains according to the grandmaster clock.

2. The time synchronization method of claim 1, wherein the plurality of time synchronization domains use different types of PTP profiles.

3. The time synchronization method of claim 2, wherein each of the plurality of PTP instances uses a same type of PTP profile corresponding to the time synchronization domain.

4. The time synchronization method of claim 1, wherein the step of obtaining the grandmaster clock from the plurality of time synchronization domains is selecting the grandmaster clock from an optimal clock of each of the plurality of time synchronization domains, and the optimal clock of each of the plurality of time synchronization domains is determined according to a best master clock algorithm (BMCA).

5. The time synchronization method of claim 4, wherein the grandmaster clock is selected by comparing priority vectors of the optimal clock of each of the plurality of time synchronization domains.

6. The time synchronization method of claim 1, wherein the clock attributes at least comprise a clock identity (ID).

7. The time synchronization method of claim 1, wherein the step of determining whether each of the plurality of ports is the time receiving port or the time transmitting port according to the grandmaster clock comprises:

determining each of the plurality of ports to be the time transmitting port when a clock of the time synchronization device is the grandmaster clock.

8. The time synchronization method of claim 7, wherein the step of modifying the clock attributes of each of the plurality of PTP instances according to whether the corresponding port is the time receiving port or the time transmitting port comprises:

keeping original clock attributes of each of the plurality of PTP instances corresponding to the time transmitting port.

9. The time synchronization method of claim 1, wherein the step of determining whether each of the plurality of ports is the time receiving port or the time transmitting port according to the grandmaster clock comprises:

when operating with a one-step mode, determining a first port of the plurality of ports to be the time receiving port in response to the first port receiving a PTP Sync message related to the grandmaster clock, and determining other ports of the plurality of ports to be the time transmitting port; and when operating with a two-step mode, determining a first port of the plurality of ports to be the time receiving port in response to the first port receiving a PTP Sync message and a PTP Follow_up message related to the grandmaster clock, and determining other ports of the plurality of ports to be the time transmitting port.

10. The time synchronization method of claim 9, wherein the step of modifying the clock attributes of each of the plurality of PTP instances according to whether the corresponding port is the time receiving port or the time transmitting port comprises:

updating the clock attributes of each of the plurality of PTP instances corresponding to the time transmitting port with the clock attributes of the grandmaster clock; and keeping original clock attributes of each of the plurality of PTP instances corresponding to the time receiving port.

11. The time synchronization method of claim 1, wherein the grandmaster clock is determined externally, and the step of determining whether each of the plurality of ports is the time receiving port or the time transmitting port according to the grandmaster clock is determined through an external port configuration method.

12. The time synchronization method of claim 11, wherein the step of modifying the clock attributes of each of the plurality of PTP instances according to whether the corresponding port is the time receiving port or the time transmitting port comprises:

updating the clock attributes of each of the plurality of PTP instances corresponding to the time transmitting port with the clock attributes of the grandmaster clock; and keeping original clock attributes of each of the plurality of PTP instances corresponding to the time receiving port.

13. The time synchronization method of claim 1, wherein the step of the plurality of PTP instances synchronizing timings of the plurality of time synchronization domains according to the grandmaster clock comprises:

transmitting, by each of the plurality of PTP instances corresponding to the time transmitting port, PTP messages with the clock attributes of the grandmaster clock to the corresponding time synchronization domain.

14. The time synchronization method of claim 13, further comprising modifying at least one of the following fields of the PTP messages:

correctionField in PTP Sync and Follow_up messages;

cumulativeRateRatio in PTP Sync and Follow_up messages;

localStepsRemoved in PTP Announce messages; and path Trace in PTP Announce messages.

15. A time synchronization device, configured to run a plurality of Precision Time Protocol (PTP) instances to connect to a plurality of time synchronization domains through a plurality of ports, comprising:

a processing unit, configured to execute a program code; and a storage unit, coupled to the processing unit, configured to store the program code to instruct the processing unit to execute a time synchronization method, wherein the time synchronization method comprises:

obtaining a grandmaster (GM) clock from the plurality of time synchronization domains;

updating clock information of the grandmaster clock;

determining whether each of the plurality of ports is a time receiving port or a time transmitting port according to the grandmaster clock;

modifying clock attributes of each of the plurality of PTP instances according to whether the corresponding port is the time receiving port or the time transmitting port; and synchronizing, by the plurality of PTP instances, timings of the plurality of time synchronization domains according to the grandmaster clock.

16. The time synchronization device of claim 15, wherein the plurality of time synchronization domains use different types of PTP profiles.

17. The time synchronization device of claim 16, wherein each of the plurality of PTP instances uses a same type of PTP profile corresponding to the time synchronization domain.

18. The time synchronization device of claim 15, wherein the step of obtaining the grandmaster clock from the plurality of time synchronization domains is selecting the grandmaster clock from an optimal clock of each of the plurality of time synchronization domains, and the optimal clock of each of the plurality of time synchronization domains is determined according to a best master clock algorithm (BMCA).

19. The time synchronization device of claim 18, wherein the grandmaster clock is selected by comparing priority vectors of the optimal clock of each of the plurality of time synchronization domains.

20. The time synchronization device of claim 15, wherein the clock attributes at least comprise a clock identity (ID).

21. The time synchronization device of claim 15, wherein the step of determining whether each of the plurality of ports is the time receiving port or the time transmitting port according to the grandmaster clock comprises:

determining each of the plurality of ports to be the time transmitting port when a clock of the time synchronization device is the grandmaster clock.

22. The time synchronization device of claim 20, wherein the step of modifying the clock attributes of each of the plurality of PTP instances according to whether the corresponding port is the time receiving port or the time transmitting port comprises:

keeping original clock attributes of each of the plurality of PTP instances corresponding to the time transmitting port.

23. The time synchronization device of claim 15, wherein the step of determining whether each of the plurality of ports is the time receiving port or the time transmitting port according to the grandmaster clock comprises:

when operating with a one-step mode, determining a first port of the plurality of ports to be the time receiving port in response to the first port receiving a PTP Sync message related to the grandmaster clock, and determining other ports of the plurality of ports to be the time transmitting port; and when operating with a two-step mode, determining a first port of the plurality of ports to be the time receiving port in response to the first port receiving a PTP Sync message and a PTP Follow_up message related to the grandmaster clock, and determining other ports of the plurality of ports to be the time transmitting port.

24. The time synchronization device of claim 23, wherein the step of modifying the clock attributes of each of the plurality of PTP instances according to whether the corresponding port is the time receiving port or the time transmitting port comprises:

updating the clock attributes of each of the plurality of PTP instances corresponding to the time transmitting port with the clock attributes of the grandmaster clock; and keeping original clock attributes of each of the plurality of PTP instances corresponding to the time receiving port.

25. The time synchronization device of claim 15, wherein the grandmaster clock is determined externally, and the step of determining whether each of the plurality of ports is the time receiving port or the time transmitting port according to the grandmaster clock is determined through an external port configuration method.

26. The time synchronization device of claim 25, wherein the step of modifying the clock attributes of each of the plurality of PTP instances according to whether the corresponding port is the time receiving port or the time transmitting port comprises:

updating the clock attributes of each of the plurality of PTP instances corresponding to the time transmitting port with the clock attributes of the grandmaster clock; and keeping original clock attributes of each of the plurality of PTP instances corresponding to the time receiving port.

27. The time synchronization device of claim 15, wherein the step of the plurality of PTP instances synchronizing timings of the plurality of time synchronization domains according to the grandmaster clock comprises:

transmitting, by each of the plurality of PTP instances corresponding to the time transmitting port, PTP messages with the clock attributes of the grandmaster clock to the corresponding time synchronization domain.

28. The time synchronization device of claim 27, wherein the time synchronization method further comprises modifying at least one of the following fields of the PTP messages:

correctionField in PTP Sync and Follow_up messages;

cumulativeRateRatio in PTP Sync and Follow_up messages;

local StepsRemoved in PTP Announce messages; and path Trace in PTP Announce messages.

* * * * *